Nov. 16, 1954     H. KONET ET AL     2,694,314
CENTERING AND CAGING MECHANISM FOR GYROSCOPES
Filed Dec. 20, 1949
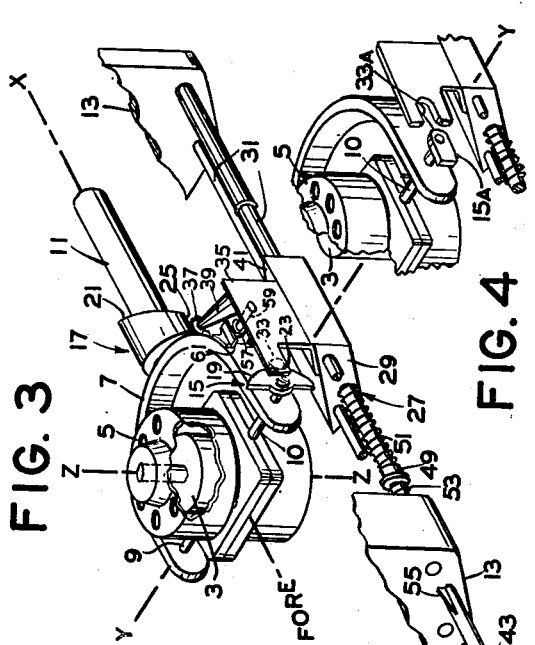
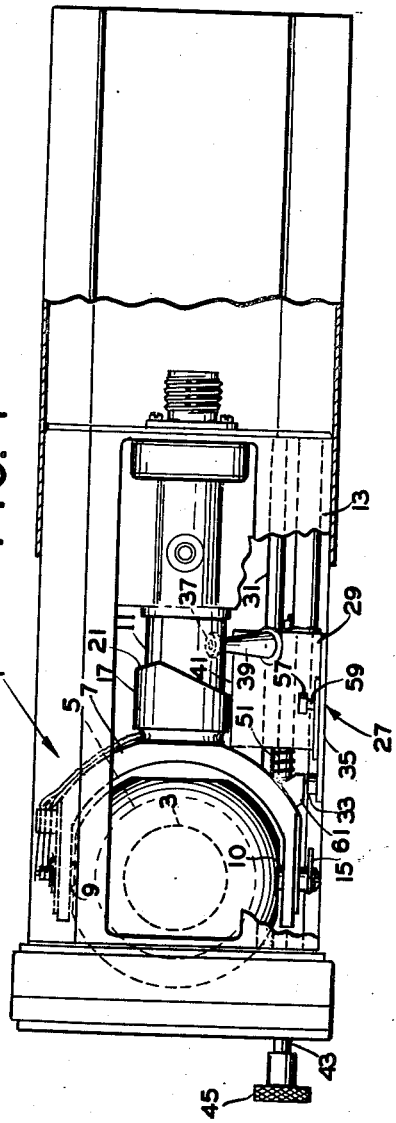
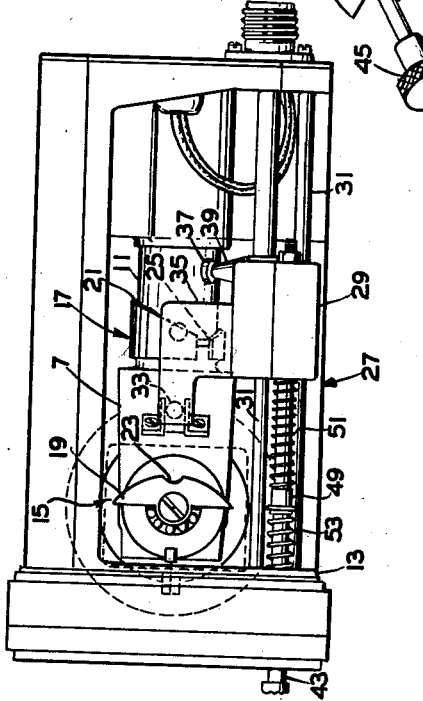
INVENTORS
HENRY KONET
PAUL E. SEIFRIED
BY
ATTORNEY

United States Patent Office 2,694,314
Patented Nov. 16, 1954

2,694,314

CENTERING AND CAGING MECHANISM FOR GYROSCOPES

Henry Konet, Hohokus, N. J., and Paul E. Seifried, New City, N. Y., assignors to Bendix Aviation Corporation, Teterboro, N. J., a corporation of Delaware Application December 20, 1949, Serial No. 134,038

11 Claims. (Cl. 74—5.1)

The invention relates to gyroscopic devices, such as gyro verticals, artificial horizons, etc., and more particularly to novel mechanism for centering or erecting and caging such devices.

One object of the present invention is to provide a novel mechanism for centering the gyroscope rotor first about one axis, and subsequently, about a second axis.

Another object is to provide a novel mechanism which will center the gyroscope rotor whether the rotor is spinning or at rest.

When the rotor is spinning and the gyroscope is centered successively about one axis and then about the other axis so that the spin axis is in a predetermined attitude relative to the housing, the resistance of the gyroscope to rotation is greater as the gyroscope is centered about one axis than when the gyroscope is centered about the other axis.

Another object of the invention is to provide a novel centering mechanism for gyroscopic devices whose action is relatively gentle so that the bearings are not injured by repeated operation.

Another object is to provide a gyroscope horizon or the like with novel centering and caging mechanism.

Another object is to provide novel centering and caging mechanism supported by the gyroscope housing and operable irrespective of the angle of departure of the rotor from centered position.

The invention contemplates a centering or erecting and caging device for a gyroscope having a rotor spinning in a case about one axis and including a gimbal mounting the case for freedom about mutually perpendicular axes at an angle to the spin axis. The device includes a cam rigid with the gimbal, and a second cam rigid with the case. A movable carriage, mounted independently of the gyroscope, includes means for engaging the cams to move the gimbal and case until the rotor spin axis assumes a predetermined attitude relative to the gyroscope housing. Initial movement of the carriage is resisted by a relatively weak spring and final movement of the carriage is resisted by a relatively strong spring to avoid damage to the bearings and other parts of the gyroscope.

The foregoing and other objects and advantages of the invention will appear more fully hereinafter from a consideration of the detailed description which follows, taken together with the accompanying drawing wherein two embodiments of the invention are illustrated. It is to be expressly understood, however, that the drawing is for the purposes of illustration and description only, and is not to be construed as defining the limits of the invention.

In the drawing, Figure 1 is a top view of an artificial horizon embodying the novel centering and caging mechanism of the present invention, and having portions cut away and having the outer housing partially removed and broken away.

Figure 2 is a side view of the instrument of Figure 1.

Figure 3 is a perspective view of the gyroscope and centering and caging mechanism showing the gyroscope in caged position.

Figure 4 is a modification of the cam structure of Figure 3 for positioning the rotor case.

Referring now to the drawing for a more detailed description of the novel centering or erecting and caging mechanism of the present invention, the latter is shown as applied to an artificial horizon gyroscope 1 including a rotor 3 rotatable within a case or support 5 for spinning about a normally vertical axis Z. The rotor case is mounted for oscillation about a horizontal pitch axis Y within a gimbal 7 by trunnions 9, 10. The gimbal is mounted for oscillation about a second horizontal roll axis X perpendicular to axis Y by a trunnion 11 supported by a frame 13. The gyro rotor has three degrees of freedom and the instrument, when mounted on a craft, has its trunnion 11 extending parallel to the longitudinal craft axis, and trunnions 9, 10 extending parallel to the transverse craft axis.

The novel caging and centering apparatus of the present invention comprises a cam 15 secured to an extension of trunnion 10 and oscillating with the rotor case about the Y axis. A cam 17 is secured to trunnion 11 and oscillates with gimbal 7 about the X axis. Cams 15 and 17 have cam faces 19 and 21, respectively. Cam face 19 of cam 15 has a detent 23 and cam face 21 of cam 17 has a slot 25 for the purposes described hereinafter.

A carriage 27 includes a box-like member 29 slidably supported on rods 31 supported by frame 13. A cam follower 33 for engaging cam 15 is mounted on a plate 35 of member 29. A cam follower 37 for engaging cam 17 is mounted on a pillar 39 extending from a plate 41 of member 29. Cam follower 33 engages cam 15 and cam follower 37 engages cam 17 when member 29 is moved forwardly on rods 31. A rod 43, slidable in frame 13, is attached at one end to member 29, and the other end mounts a knob 45 to facilitate forward movement of the slide mechanism.

As shown in Figure 3, when carriage 27 is moved forwardly by pulling on knob 45, cam follower 37 rides on cam face 21 and rotates gimbal 7 about the roll axis X until cam follower 37 is positioned in slot 25 and gimbal 7 is centered. Further forward movement of carriage 27 causes cam follower 33 to ride on cam face 19 and rotate rotor case 5 about the pitch axis Y until cam follower 33 is positioned in detent 23 and the rotor case is centered.

A collar 49 is slidably mounted on rod 43 and a spring 51 is positioned on rod 43 between the collar and member 29 and a spring 53 is positioned on rod 43 between collar 49 and frame 13. Spring 51 resists forward movement of carriage 27 while gimbal 7 is being centered and preferably is of less compression resistance than spring 53 and preferably is bottomed before spring 53 begins to compress. Spring 53 resists subsequent forward movement of carriage 27 when rotor case 5 is being centered.

After the gyroscope is caged about the roll axis X, only a relatively small force would be required to cage it about the pitch axis Y if the resistances of springs 51, 53 were the same, but by providing springs of different resistances, the forces required to cage the gyro about the roll and pitch axes may be equalized to avoid damage to the gyroscope.

The carriage may be held in forward position against the forces of springs 51, 53 to cage the gyroscope by a spring latch 55 on rod 43 which engages frame 13. When the latch is depressed and released, springs 51, 53 return the carriage to uncaging position.

A supplemental roller 57 supported by a pillar 59 secured to plate 35 may engage a channel-shaped element 61 on gimbal 7 to maintain the gimbal in centered position about the roll axis X in addition to cam follower 37 engaging the walls of slot 25.

In the modification of Figure 4, a cam-like element 15A may be substituted for cam 15 on trunnion 10 and a fork-like member 33A may be substituted for cam follower 33. When carriage 27 is moved forwardly, fork-like member 33A receives element 15A and rotates rotor case 5 about the pitch axis to centered position.

The action of the novel centering or erecting and caging mechanism described herein is relatively gentle, so that the bearings are not injured by repeated operation. The gyroscope is centered first about one axis and subsequently about a second axis, and the gyroscope may be centered whether the rotor is spinning or at rest. The mechanism is operable notwithstanding the angle of departure of the rotor spin axis from normal operating position.

The mechanism described may be used to erect the gyroscope spin axis to a predetermined attitude after the spin axis departs therefrom as during a craft turn. For example, the spin axis may be erected to the vertical by operating the centering mechanism when the craft is in straight and level flight.

Although but two embodiments of the invention have been illustrated and described in detail, it is to be expressly understood that the invention is not limited thereto. Various changes can be made in the design and arrangement of the parts without departing from the spirit and scope of the invention as the same will now be understood by those skilled in the art.

What is claimed is:

1. A caging and centering device for a gyroscope, comprising the combination with a rotor adapted for spinning in a support about one axis and means including a gimbal mounting said support for freedom about mutually perpendicular axes other than said spin axis, of means including a member fixed relative to the gimbal and rotatable with said gimbal, a second member rotatable with said support, and a movable carriage mounted independently of the gyroscope and including means fixed to said carriage for directly engaging said members to center the gimbal and support.

2. Structure as described in claim 1 in which one of the members comprises an elongated element and the engaging means comprises a forked member receiving said element.

3. In a gyroscope having a rotor spinning in a support about one axis, and means including a gimbal mounting said support for rotation about mutually perpendicular axes other than said spin axis, cam-like members rotatable with said gimbal and with said support, and a movable carriage mounted independently of the gimbal and support and including means for engaging said cam-like members to erect said gimbal and support with the rotor spin axis in a predetermined attitude.

4. In a gyroscope having a rotor spinning in a support about one axis, means including a gimbal mounting said support for rotation about mutually perpendicular axes at an angle to said spin axis, members rotatable with said gimbal and with said support, and a sliding carriage including a pair of elements fixed thereto for directly engaging said members to center said gimbal and support, and means mounting said members and elements relative to one another so that said member rotatable with said gimbal is engaged first by the associated element upon movement of said carriage to center said gimbal, and said member rotatable with said support is later engaged by the other associated element upon subsequent movement of said carriage to center said support.

5. In a gyroscope having a rotor spinning in a support about one axis and means including a gimbal mounting said support for rotation about mutually perpendicular axes other than said spin axis, cam-like members rotatable with said gimbal and with said support, and a carriage slidable relative to said gimbal and support and including follower means for engaging said cam-like members to center said gimbal and support, and means resisting initial movement of said carriage, and means of relatively greater resistance resisting subsequent movement of said carriage.

6. In a gyroscope having a rotor spinning in a support about one axis and means including a gimbal mounting said support for rotation about mutually perpendicular axes other than said spin axis, members rotatable with said gimbal and with said support, and a carriage mounted for sliding movement relative to said gimbal and support and including means fixed to said carriage for directly engaging said members to successively center said gimbal and support, and means operatively associated with said carriage and exerting a relatively small force to resist movement of said carriage while centering said gimbal, and means operatively associated with said carriage and exerting a relatively great force to resist movement of said carriage while centering said support.

7. In a gyroscope, a rotor spinning about one axis, a support mounting said rotor, a gimbal mounting said support for rotation about a second axis other than said spin axis, a frame mounting said gimbal for rotation about an axis perpendicular to said second axis, cam-like members rotatable with said gimbal and with said support, a rod fixed to said frame, a carriage slidable on said rod and including a cam follower for engaging each of said cams to center the gimbal and support with the rotor spin axis in a predetermined attitude.

8. In a gyroscope having a rotor adapted for spinning in a support about one axis and means including a gimbal for mounting said support for rotation about mutually perpendicular axes other than said spin axis, cam-like members rotatable with said gimbal and with said support, a movable carriage mounted independently of the gimbal and support and including a follower for engaging each of said cam-like members to center the gimbal and support with the rotor spin axis in a predetermined attitude, a rod for actuating said carriage, and a pair of springs mounted on said rod and of different compression characteristics, one of said springs being relatively weaker than the other of said springs and resisting initial movement of said carriage and the other spring resisting subsequent movement of said carriage.

9. In a gyroscope having a rotor spinning in a support about one axis and means including a gimbal mounting said support for rotation about mutually perpendicular axes at an angle to said spin axis, members fixed relative to and rotatable with said gimbal and with said support, and a movable carriage mounted independently of the gimbal and support and including means fixed to said carriage for directly engaging said members to center said gimbal and support, and means to maintain said carriage in position to lock said gimbal and support in centered position.

10. A caging and centering device for a gyroscope, comprising the combination with a rotor adapted for spinning in a support about one axis and means including a gimbal mounting said support for freedom about mutually perpendicular axes other than said spin axis, of means including a member rotatable with said gimbal, a second member rotatable with said support, and a carriage movable relative to said members and including means for engaging said members to center said gimbal and support, each of said members including a cam surface and one of said members being slotted to receive said engaging means when said gimbal is centered, and said other member having a detent to receive said engaging means when said rotor support is centered.

11. A caging and centering device for a gyroscope, comprising the combination with a rotor adapted for spinning in a support about one axis and means including a gimbal mounting said support for freedom about mutually perpendicular axes other than said spin axis, of means including a member rotatable with said gimbal, a second member rotatable with said support, a movable carriage mounted independently of the gyroscope and including means fixed to said carriage for directly engaging said members to center the gimbal and support, and a pair of springs of different compression resistance for resisting movement of said carriage, and means for operating the spring of lesser compression resistance to resist initial movement of said carriage and for operating the spring of greater compression resistance to resist subsequent movement of said carriage.

References Cited in the file of this patent

UNITED STATES PATENTS

| Number | Name | Date |
|---|---|---|
| 2,366,721 | Gabrielson | Jan. 9, 1949 |
| 2,459,496 | Cahill et al. | Jan. 18, 1949 |
| 2,468,016 | Konet | Apr. 19, 1949 |
| 2,491,813 | Jordon | Dec. 20, 1949 |